US009973859B2

(12) United States Patent
Pompei

(10) Patent No.: US 9,973,859 B2
(45) Date of Patent: May 15, 2018

(54) AMPLIFIERS FOR PARAMETRIC LOUDSPEAKERS

(71) Applicant: Frank Joseph Pompei, Wayland, MA (US)

(72) Inventor: Frank Joseph Pompei, Wayland, MA (US)

( * ) Notice: Subject to any disclaimer, the term of this patent is extended or adjusted under 35 U.S.C. 154(b) by 0 days. days.

(21) Appl. No.: 15/045,867

(22) Filed: Feb. 17, 2016

(65) Prior Publication Data

US 2016/0241966 A1 Aug. 18, 2016

Related U.S. Application Data

(60) Provisional application No. 62/117,027, filed on Feb. 17, 2015.

(51) Int. Cl.

| | |
|---|---|
| ***H04B 3/00*** | (2006.01) |
| ***H04R 19/02*** | (2006.01) |
| *H04R 29/00* | (2006.01) |
| *B06B 1/02* | (2006.01) |

(52) U.S. Cl.

CPC ............ *H04R 19/02* (2013.01); *B06B 1/0292* (2013.01); *H04R 29/001* (2013.01); *H04R 2217/03* (2013.01)

(58) Field of Classification Search

CPC ...... H04R 2217/03; H04R 3/00; H04R 19/02; H04R 29/001

USPC ........................................................ 381/77, 79

See application file for complete search history.

(56) References Cited

U.S. PATENT DOCUMENTS 7,146,011 B2 * 12/2006 Yang ...................... G10K 11/26 367/138
8,009,838 B2 * 8/2011 Lee ........................ H04R 19/02 381/77
2004/0264707 A1 * 12/2004 Yang ...................... G10K 11/26 381/77
2005/0195985 A1 * 9/2005 Croft, III ............... H04R 17/00 381/77
2015/0381782 A1 * 12/2015 Park ........................ H04M 9/08 381/100

* cited by examiner

*Primary Examiner* — Disler Paul
(74) *Attorney, Agent, or Firm* — BainwoodHuang

(57) ABSTRACT

Systems and methods of audio processing and control for improved audibility and performance in a parametric loudspeaker system. The parametric loudspeaker system includes a parametric loudspeaker providing a capacitive load, an output stage having a plurality of switches interconnected in a bridge configuration and connected to the capacitive load of the parametric loudspeaker, and a controller operative to generate a series of pulse width modulation (PWM) pulses, and to generate a plurality of control signals synchronized with the series of PWM pulses for switchingly controlling the plurality of switches in the bridge configuration, thereby driving the capacitive load of the parametric loudspeaker.

11 Claims, 7 Drawing Sheets

AMPLIFIERS FOR PARAMETRIC LOUDSPEAKERS

CROSS-REFERENCE TO RELATED APPLICATIONS

This application claims benefit of the priority of U.S. Provisional Patent Application No. 62/117,027 filed Feb. 17, 2015 entitled AMPLIFIERS FOR PARAMETRIC LOUDSPEAKERS.

TECHNICAL FIELD

The present application relates generally to parametric loudspeaker systems, and more specifically to amplifiers for parametric loudspeaker systems.

BACKGROUND

Parametric loudspeaker systems are known that employ ultrasonic transducers for projecting ultrasonic carrier signals modulated with audio signals through the air for subsequent reproduction of the audio signals along a selected path of projection. A conventional parametric loudspeaker system can include a modulator for modulating an ultrasonic carrier signal with an audio signal, at least one driver amplifier for amplifying the modulated ultrasonic carrier signal, and one or more ultrasonic transducers for directing the amplified, modulated ultrasonic carrier signal through the air along the selected projection path. For example, each ultrasonic transducer can be a membrane transducer, such as an electrostatic transducer or a piezoelectric transducer, either ceramic or membrane-type. Due to the non-linear propagation characteristics of the air, the modulated ultrasonic carrier signal is demodulated as it passes through the air, thereby reproducing the audio signal along the selected projection path.

Amplifier design for such parametric loudspeaker systems can present unique challenges. Unlike traditional loudspeaker systems that are typically weakly inductive, parametric loudspeaker systems tend to be highly capacitive. Further, while traditional loudspeaker systems are typically current-driven, some parametric loudspeaker systems are voltage driven. Moreover, the frequency range for parametric loudspeaker systems tend to be far greater than that of traditional loudspeaker systems.

SUMMARY

In accordance with the present application, improved amplifier designs for parametric loudspeaker systems are disclosed. Systems and methods of audio processing and control for improved audibility and performance in parametric loudspeaker systems are further disclosed. In one aspect, an exemplary parametric loudspeaker system includes an audio pre-processor/conditioner, an envelope detector/nonlinear processor, a clipping module, a comparator/scale circuit, a modulator, an amplifier/output stage, an ultrasonic carrier generator, a first level/measure circuit, a second level/measure circuit, a first divider circuit (x/y), a second divider circuit (1/z), and a parametric loudspeaker. In an exemplary aspect, the amplifier/output stage can provide a series-resonant load, a parallel-resonant load, or any suitable combination of series/parallel resonant loads, as well as passive filters (e.g., low pass, bandpass). Such resonant loads and filters typically include an inductance (either standalone or as part of a transformer) that resonates with the capacitance of an ultrasonic/acoustic transducer. The value of such a resonant inductance is generally selected to correspond to approximately the carrier frequency. The parametric loudspeaker can include one or more such ultrasonic/acoustic transducers implemented as membrane transducers, such as electrostatic transducers, or ceramic or membrane-type piezoelectric transducers, or any other suitable ultrasonic/acoustic transducers.

In an exemplary mode of operation, the audio pre-processor/conditioner can receive an audio input signal, and perform equalization, compression, and/or any other suitable pre-processing/conditioning of the audio input signal. The audio pre-processor/conditioner provides the pre-processed/conditioned audio input signal to the envelope detector/nonlinear processor, which can detect the envelope of the audio input signal, as well as provide an adjusting offset such that, when the envelope signal is summed with the audio input signal, the resulting summed signal is entirely positive. This allows nonlinear processing (e.g., a square root function or its approximation) to be applied to the sum of the envelope signal and the audio input signal while avoiding overmodulation.

Because the amplifier/output stage can be configured to provide a series-resonant load, its gain can vary with inductor characteristics, characteristics of the ultrasonic/acoustic transducer(s) of the parametric loudspeaker, etc. For this reason, the audio pre-processor/conditioner is configured to allow volume settings to be made consistent between similar such parametric loudspeaker systems, and the clipping module is configured to assure that the parametric loudspeaker system has protection from overdrive voltages and is voltage-clipped correctly. Further, because the nonlinear processing performed by the envelope detector/nonlinear processor is output level dependent, the comparator/scale circuit is configured to provide proper scaling and to minimize audible distortion.

The clipping module provides the pre-modulated envelope signal to the first level/measure circuit, and the amplifier/output stage provides the output drive signal to the second level/measure circuit. The first and second level/measure circuits then provide their outputs, x, y, respectively, to the divider circuit (x/y), which divides the output, x, by the output, y, to obtain what is referred to herein as the "inverse gain parameter." The divider circuit (x/y) scales the inverse gain parameter (x/y), and provides the scaled inverse gain parameter as an output, z, which represents the signal level that would be required to generate a specified maximum ultrasonic/acoustic transducer output signal. The divider circuit (1/z) provides the inverse of the output, z (i.e., 1/z) to a multiplier circuit in order to pre-scale the input audio signal, thereby advantageously assuring that the volume and processing settings of the parametric loudspeaker system are made to be consistent between similar such parametric loudspeaker system. Further, the divider circuit (x/y) provides its output, z, to another multiplier circuit in order to post-scale the processed signal at the output of the envelope detector/nonlinear processor prior to the processed signal being hard-clipped by the clipping module, thereby advantageously assuring consistent volume, processing, and/or voltage-clipping levels, regardless of resonance characteristics.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein, and, together with the Detailed Description, explain these embodiments. In the drawings.

DETAILED DESCRIPTION

The disclosure of U.S. Provisional Patent Application No. 62/117,027 filed Feb. 17, 2015 entitled AMPLIFIERS FOR PARAMETRIC LOUDSPEAKERS is hereby incorporated herein by reference in its entirety.

Figure 1:
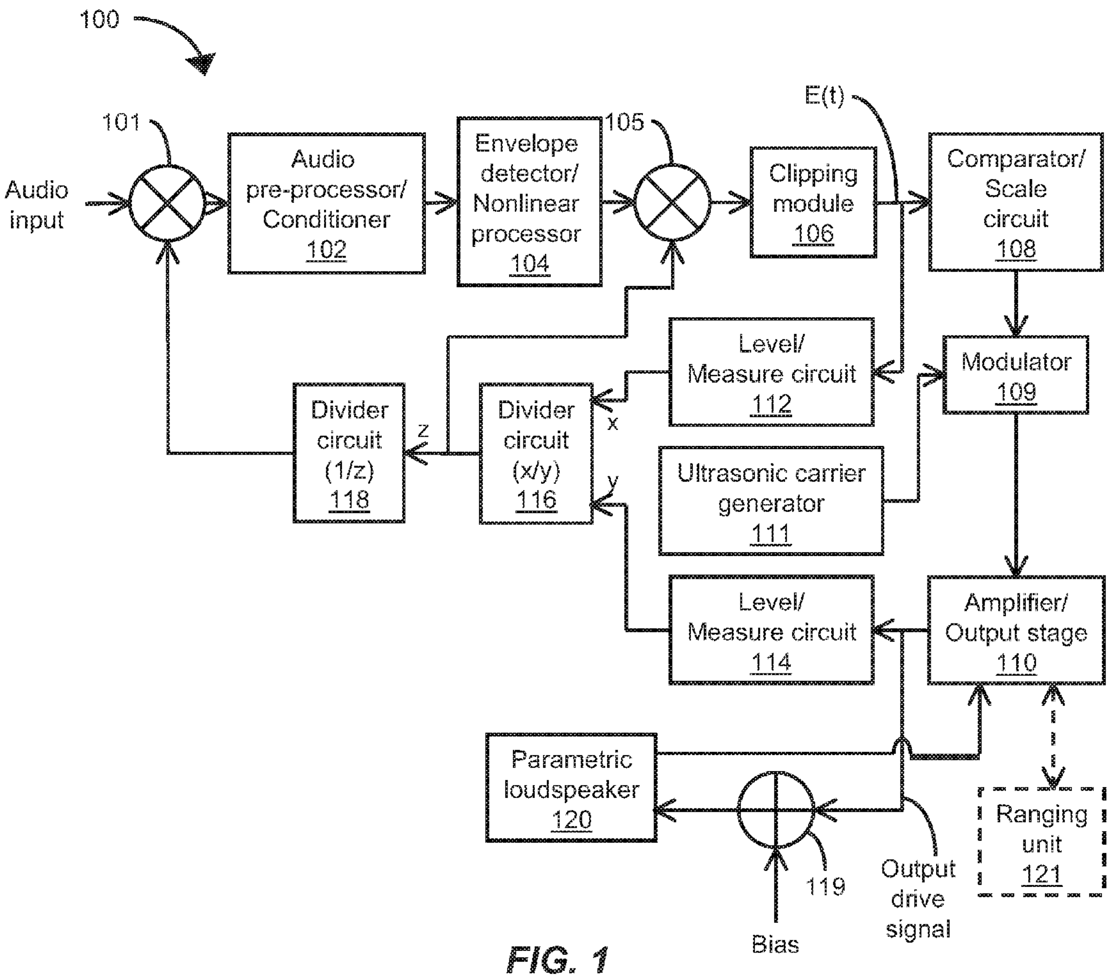
FIG. 1 is a block diagram of an exemplary parametric loudspeaker system, in accordance with the present application.

FIG. 1 depicts an illustrative embodiment of an exemplary parametric loudspeaker system 100, in accordance with the present application. As shown in FIG. 1, the parametric loudspeaker system 100 includes a first multiplier circuit 101, an audio pre-processor/conditioner 102, an envelope detector/nonlinear processor 104, a second multiplier circuit 105, a clipping module 106, a comparator/scale circuit 108, a modulator 109, an amplifier/output stage 110, an ultrasonic carrier generator 111, a first level/measure circuit 112, a second level/measure circuit 114, a first divider circuit (x/y) 116, a second divider circuit (1/z) 118, a summing circuit 119, a parametric loudspeaker 120, and an optional ranging unit 121. For example, the amplifier/output stage 110 can provide a series-resonant load, a parallel-resonant load, or any suitable combination of series/parallel resonant loads and/or associated active or passive filtering.

Further, the parametric loudspeaker 120 can include one or more ultrasonic/acoustic transducers implemented as membrane transducers, such as electrostatic transducers or membrane-type piezoelectric transducers, or any other suitable ultrasonic/acoustic transducers. It is noted that, in the case of multiple transducers recreating different ultrasonic signals, various elements of the parametric loudspeaker system 100 can be shared between them.

In one mode of operation, the audio pre-processor/conditioner 102 can receive an audio input signal, and perform equalization, compression, and/or any other suitable pre-processing/conditioning of the audio input signal. The audio pre-processor/conditioner 102 provides the pre-processed/conditioned audio input signal to the envelope detector/nonlinear processor 104, which can detect the envelope of the audio input signal, as well as provide an adjusting offset such that, when the envelope signal is summed with the audio input signal, the resulting summed signal is entirely positive. This allows nonlinear processing (e.g., a square root function, or any other suitable nonlinear function) to be applied to the sum of the envelope signal and the audio input signal while avoiding overmodulation.

Particularly because the amplifier/output stage 110 can be configured to provide a series-resonant load for use in voltage amplification and/or filtering, its gain can vary with inductor characteristics, characteristics of the ultrasonic/acoustic transducer(s) of the parametric loudspeaker 120, etc. For this reason, the audio pre-processor/conditioner 102 is configured to allow volume settings to be made consistent between similar such parametric loudspeaker systems, and the clipping module 106 is configured to assure that the parametric loudspeaker system 100 has protection from overdrive voltages and is voltage-clipped correctly. Further, because the nonlinear processing performed by the envelope detector/nonlinear processor 104 is output level dependent, the comparator/scale circuit 108 is configured to provide proper scaling and to minimize audible distortion. Such a series-resonant load can be formed by one or more inductors of the amplifier/output stage 110 coupled to a capacitive load of one or more ultrasonic/acoustic transducers within the parametric loudspeaker 120.

While the gain quantity of the amplifier/output stage 110 can be measured once either at startup or in the factory, it can be useful to have it continuously calculated to account for any physical and/or environmental changes that might occur over time. This can be done by dividing the pre-modulated envelope signal, E(t), provided at the output of the clipping module 106 (or implemented in software using, for example, a digital signal processor 224; see FIG. 2) by the measured output drive level of the ultrasonic/acoustic transducer(s) of the parametric loudspeaker 120. Such measurements of the output drive level can be made either without having a DC bias signal ("Bias;" see FIG. 1) "piggybacked" onto an AC output drive signal from the amplifier/output stage 110, or with the bias signal added onto the output drive signal if an adjustment capability for the bias is provided. For example, such a bias signal (Bias; typically 300 volts) can be summed with an ultrasonic output drive signal ("Output drive signal;" see FIG. 1) generated by the amplifier/output stage 110 by the summing circuit 119, for use in amplifying the ultrasonic/acoustic transducer output, as well as improving linearity.

Figure 8:
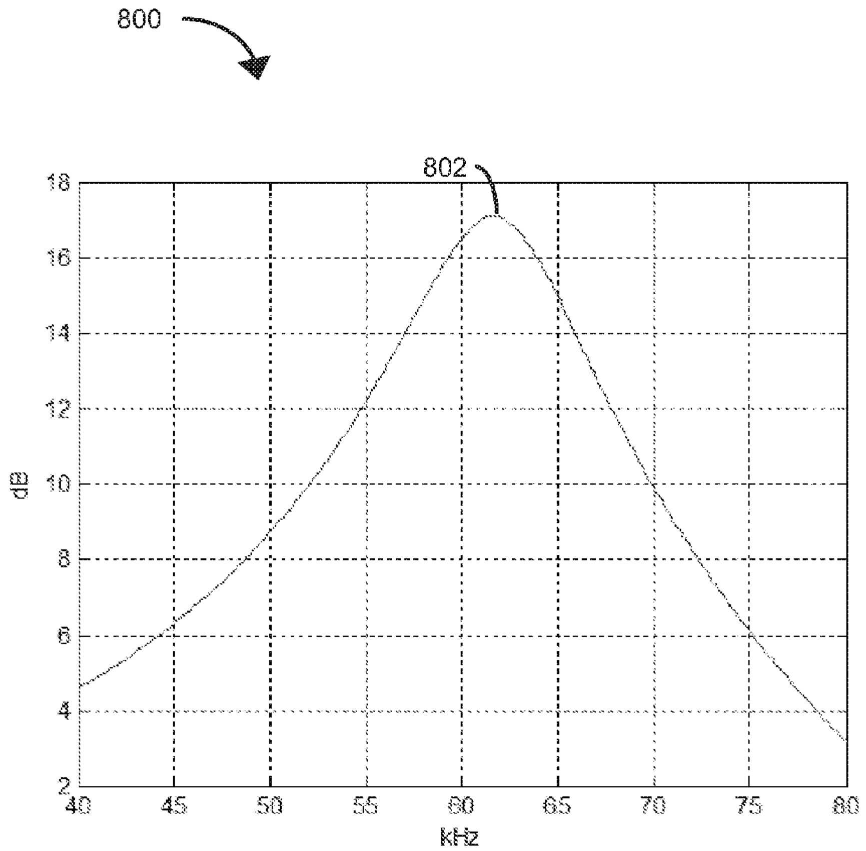
FIG. 8 is a diagram of an exemplary voltage gain in a series-resonance circuit.

As shown in FIG. 1, the clipping module 106 provides the pre-modulated envelope signal, E(t), to the level/measure circuit 112, and the amplifier/output stage 110 provides the output drive signal to the level/measure circuit 114. For example, the level/measure circuits 112, 114 can be implemented as averaging circuits, envelope followers, peak-detectors, or any other suitable circuits for obtaining desired voltage levels. In one embodiment, the level/measure circuits 112, 114 can each be implemented as a peak-detector with slow decay for ease of implementation and increased accuracy. In particular, the use of a peak detector or similar routine allows an accurate level measurement of the ultrasonic signal, without requiring high-speed ultrasonic-band measurement hardware (e.g., analog-to-digital converters (ADCs)). Only audio-band (or slower) measurement hardware is required. The level/measure circuits 112, 114 then provide their outputs, x, y, respectively, to the divider circuit (x/y) 116, which divides the output, x (derived from the envelope signal, E(t)), by the output, y (derived from the output drive signal) to obtain what is referred to herein as the "inverse gain parameter." It is noted that such an inverse gain parameter (x/y) is typically small when the resonant gain is large, and vice-versa. FIG. 8 depicts an exemplary inverse gain 800 in a series-resonance circuit, in which a resonant inductance is in series with the capacitive transducer. The resonant peak 802 varies according to transducer and inductor characteristics, and therefore the input-to-output ratio (or inverse-gain) is preferably tracked.

It is further noted that other signals generated within the parametric loudspeaker system 100 (e.g., the signal at the output of the comparator/scale circuit 108, the bias signal, with suitable adjustments) may be used to obtain the inverse gain parameter (x/y), so long as they can provide suitable representations of the envelope signal, E(t), and the output drive signal, allowing their ratio to be calculated or estimated. Moreover, the division performed by the divider circuit (x/y) 116 may be inverted (i.e., y/x), so that the output, y (derived from the output drive signal), is divided by the output, x (derived from the envelope signal, E(t)), to obtain what is referred to herein as simply the "gain parameter." In each case, the divider circuit (x/y or y/x) 116 provides its output, z, as a representation (or estimate) of how the output drive signal relates to the envelope signal E(t).

The divider circuit (x/y or y/x) 116 scales the inverse gain parameter (x/y) (or the gain parameter (y/x)), and provides the scaled inverse gain parameter (or the scaled gain parameter) as the output, z, which represents the signal level that would be required to generate a specified maximum ultrasonic/acoustic transducer output signal (e.g., 300 volts peak-to-peak (p-p)). The divider circuit (1/z) 118 provides the inverse of the output, z (i.e., 1/z) to the multiplier circuit 101 in order to pre-scale the input audio signal, thereby assuring that the volume and processing settings of the parametric loudspeaker system 100 are made to be consistent between similar such parametric loudspeaker systems. Further, the divider circuit (x/y or y/x) 116 provides its output, z, to the multiplier 105 in order to post-scale the processed signal at the output of the envelope detector/nonlinear processor 104 prior to the processed signal being hard-clipped by the clipping module 106, thereby assuring consistent volume, processing, and/or voltage-clipping levels, regardless of resonance characteristics. In an alternative embodiment, the parametric loudspeaker system 100 may implement such scaling only at the multiplier circuit 101 (using the inverse gain parameter (x/y) or the gain parameter (y/x)). However, such an alternative approach may prove to be less reliable than the pre-scaling and post-scaling approach described herein. By collecting a reasonable and regular estimate of transducer signal level (output), as well as the internal signal level (input), the parametric loudspeaker system 100 can accurately predict the output level for any given input level, even across transducer and inductor variations, and time-varying and thermal effects. With this prediction, the internal processing signals can be scaled for consistency and accuracy, and a safe and consistent voltage clipping level can be established.

It is noted that small signals can be ignored so as not to confound the gain measurements/calculations performed within the parametric loudspeaker system 100. Further, at least one threshold can be set, below which certain gain measurements/calculations may be discarded, or given less weight. Upon startup of the parametric loudspeaker system 100, the output drive signal (e.g., a low frequency tone, a "welcome"/"startup" sound) can be allowed to play, effectively "seeding" the gain calculation and assuring that the gain measurements/calculations are accurate, continuous, and stable.

In an alternative embodiment, the amplifier/output stage 110 and the parametric loudspeaker 120 can be configured to provide parallel resonance instead of series resonance. However, in such an embodiment, the voltage response of the parametric loudspeaker system 100 typically tends to be flatter. In the disclosed embodiment, the gain of the parametric loudspeaker system 100 can be measured/calculated at regular intervals and for sufficient signal levels in order to compensate for the gain possibly varying over time and/or in response to changes in physical and/or environmental conditions. As a result, more accurate and consistent drive signal outputs between similar such parametric loudspeaker systems can be obtained, and more accurate and consistent nonlinear processing can be performed within the parametric loudspeaker systems for reduced audible distortion.

PWM Scheme

Figure 3C:
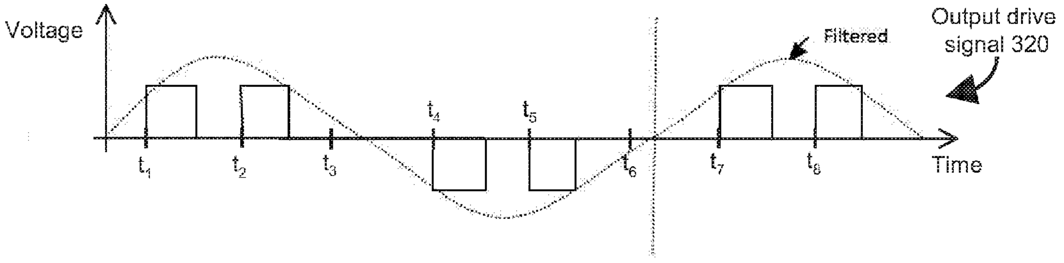
FIGS. 3*a*-3*c* are a diagrams of exemplary waveforms for implementing a pulse width modulation (PWM) scheme for the amplifier system of FIG. 2.
Figure 2:
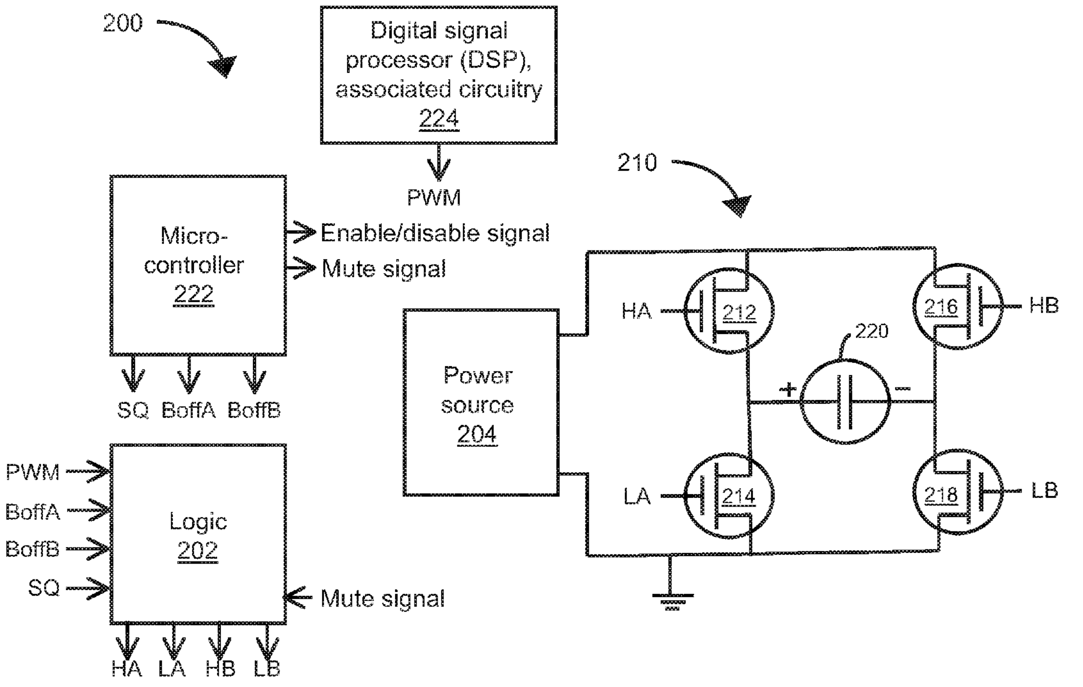
FIG. 2 is a block diagram of an exemplary amplifier system for use in the parametric loudspeaker system of FIG. 1.

FIG. 2 depicts an illustrative embodiment of an exemplary amplifier/output stage 200 that includes an H-bridge 210, which can be controlled in accordance with a pulse-width modulation (PWM) scheme. As shown in FIG. 2, the amplifier/output stage 200 includes a current (or voltage) power source 204 that can be coupled to the capacitive load of a parametric loudspeaker 220 through a plurality of interconnected switches 212, 214, 216, and 218. The amplifier/output stage 200 further includes logic 202 configured to control the operation of the power source 204 and the plurality of interconnected switches 212, 214, 216, and 218 in order to provide at least one controlled, switched output drive signal (e.g., a drive signal 320; see FIG. 3*c*) for driving the capacitive load of the parametric loudspeaker 220. It is noted that the element 220 (see FIG. 2) can include the resonant inductance and an isolation transformer, as well as other components of the transducer load.

Figure 3A:
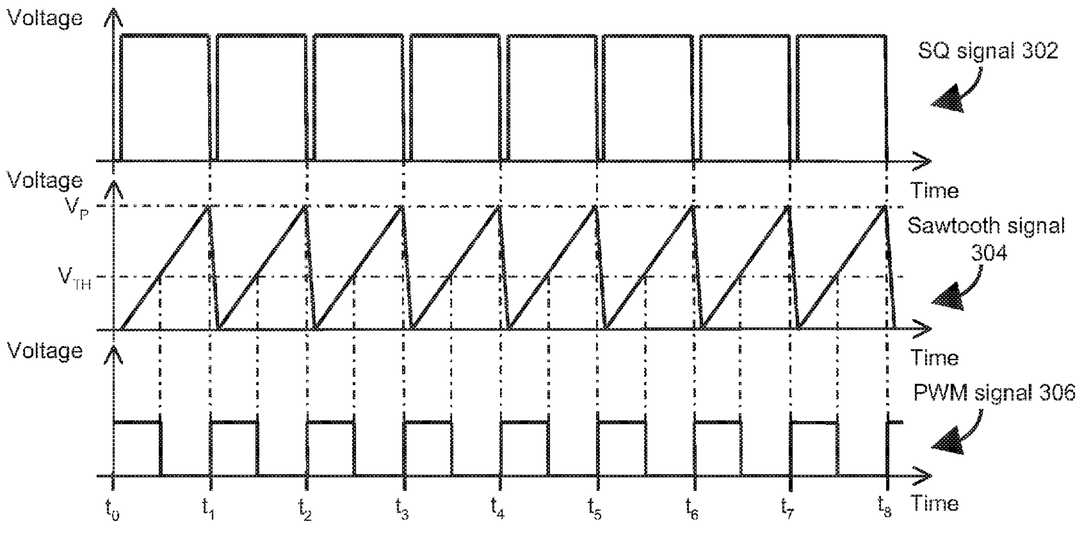
Figure 3B:
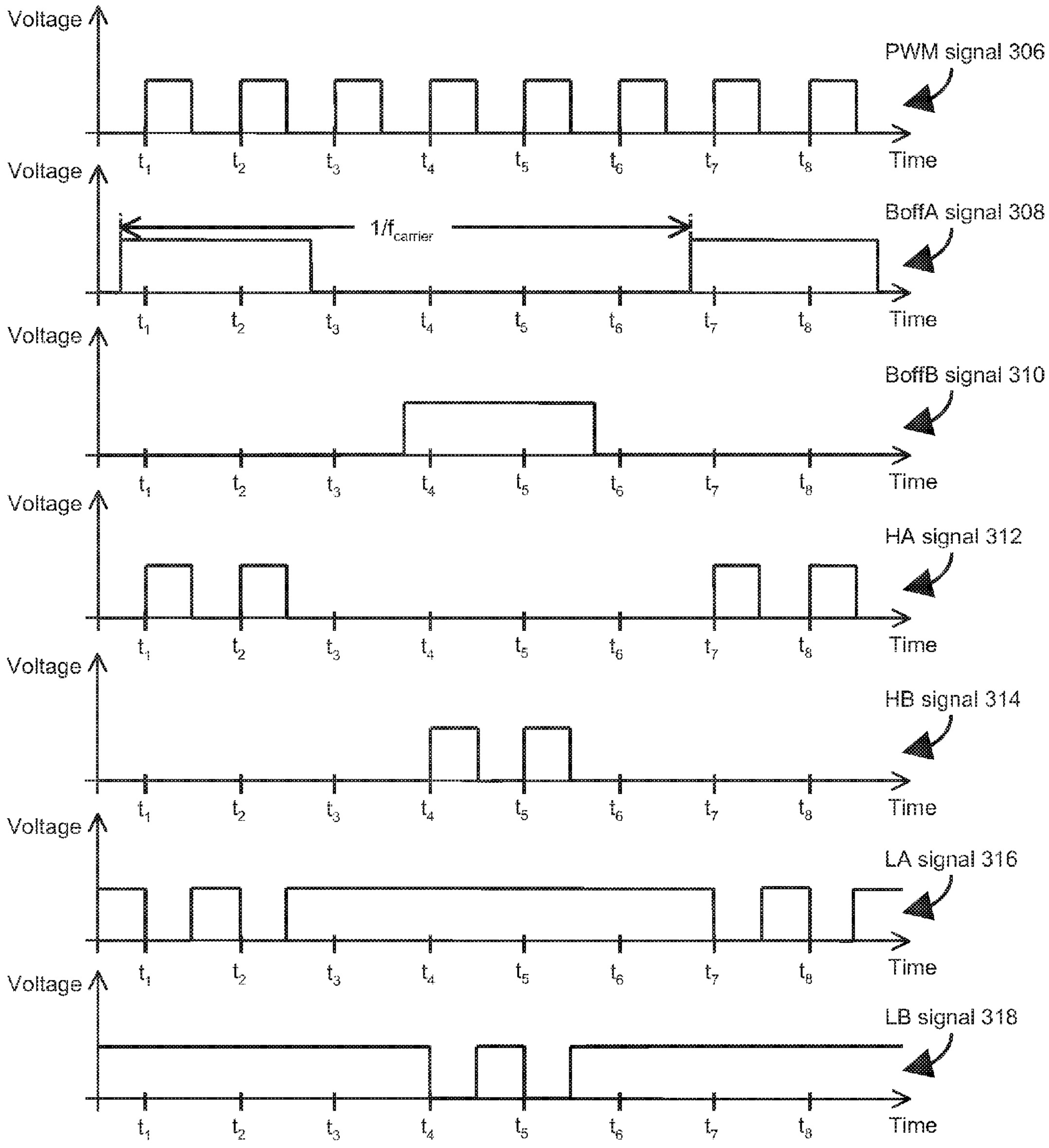

In one embodiment, the PWM scheme for controlling the H-bridge 210 (see FIG. 2) involves the generation of at least three synchronized signals, namely, an SQ signal 302 (see FIG. 3*a*), a BoffA signal 308 (see FIG. 3*b*), and a BoffB signal 310 (see also FIG. 3*b*). In this embodiment, the SQ signal 302, the BoffA signal 308, and the BoffB signal 310 can be generated by a microcontroller 222, based on the outputs of the comparator/scale circuit 108 (see FIG. 1) and/or the modulator 109 (see also FIG. 1). In an alternative embodiment, the SQ, BoffA, and BoffB signals 302, 308, 310 can be generated by a digital signal processor (DSP), or any other suitable controller or processor, or can be created internally to any of these devices as software signals.

As shown in FIG. 3*a*, the SQ signal 302 can be integrated (e.g., using a digital signal processor (DSP) 224 and associated circuitry) to produce a sawtooth (or triangle) signal 304 for use in generating a PWM signal 306. At each rising edge of the SQ signal 302, the voltage of the sawtooth signal 304 ramps up from a zero (0) voltage to a peak voltage, $V_P$. At each falling edge of the SQ signal 302, a pulse of the PWM signal 306 is asserted, and the sawtooth signal 304 transitions abruptly from its peak voltage, $V_P$, back to the zero (0) voltage. At a predetermined threshold voltage, $V_{TH}$, of the sawtooth signal 304 (which corrresponds to the processed audio signal, E(t)), each pulse of the PWM signal 306 is deasserted, thereby producing a series of pulse-width modulated pulses at times $t_0$, $t_1$, $t_2$, and so on, of the PWM signal 306 (see FIG. 3*a*).

It is noted that the envelope signal, E(t), at the output of the clipping module 106 (see FIG. 1) can, optionally, be scaled to track the amplitude of the sawtooth (or triangle) signal 304, which can be dependent upon the frequency of an ultrasonic carrier signal generated by the ultrasonic carrier generator 111. It is further noted that the comparator/scale circuit 108 can likewise be dependent upon the setting of the ultrasonic carrier frequency. Moreover, the SQ signal 302 can be generated at about six times (6×) the ultrasonic carrier frequency, or any other suitable frequency.

With reference to FIG. 3*b*, the BoffA signal 308 and the BoffB signal 310 are each periodic to about one times (1×) the ultrasonic carrier frequency ($f_{carrier}$). In one embodiment, the microcontroller 222 can generate the SQ signal 302 (see FIG. 3*a*), the BoffA signal 308 (see FIG. 3*b*), and the BoffB signal 310 (see FIG. 3*b*) based on the same clock signal, using any suitable counter(s) and/or logic. As shown in FIG. 3*b*, the PWM signal 306 is offset relative to each of the BoffA and BoffB signals 308, 310 by about one half of a cycle, thereby assuring that the BoffA and BoffB signals 308, 310 each change state only when the PWM signal 306 is low (i.e., inactive).

In one embodiment, the logic 202 (see FIG. 2) can generate high-side switching signals, namely, an HA signal 312 (see FIG. 3*b*) and an HB signal 314 (see FIG. 3*b*), as well as low-side switching signals, namely, an LA signal 316 (see FIG. 3*b*) and an LB signal 318 (see FIG. 3*b*), for controlling the plurality of interconnected switches 212, 214, 216, 218 of the H-bridge 210. As shown in FIG. 2, the high-side switching signals HA, HB are applied to the switches 212, 216, respectively, and the low-side switching signals LA, LB are applied to the switches 214, 218, respectively.

In order to generate the HA signal 312, the HB signal 314, the LA signal 316, and the LB signal 318, the logic 202 can logically combine the PWM signal 306 with the BoffA signal 308 and the BoffB signal 310 in various ways. In one embodiment, the logic 202 can employ an exemplary scheme using AND and NOT logic, as follows:

$$HA = \text{PWM} \;\&\; BoffA, \tag{1}$$

$$HB = \text{PWM} \;\&\; BoffB, \tag{2}$$

$$LA = !HA, \text{ and} \tag{3}$$

$$LB = !HB, \tag{4}$$

in which "HA" corresponds to the HA signal 312, "HB" corresponds to the HB signal 314, "LA" corresponds to the LA signal 316, "LB" corresponds to the LB signal 318, "PWM" corresponds to the PWM signal 306, "&" corresponds to the AND logical operator, and "!" corresponds to the NOT logical operator. In another embodiment, the logic 202 can employ an alternative exemplary scheme using NAND and AND logic along with a mute signal (see FIG. 2), as follows:

$$LA = !(\text{PWM} \;\&\; BoffA), \tag{5}$$

$$LB = !(\text{PWM} \;\&\; BoffB), \tag{6}$$

$$HA = (!LA) \;\&\; \text{NotMute},\; HA = !(LA|\text{Mute}), \text{ and} \tag{7}$$

$$HB = (!LB) \;\&\; \text{NotMute},\; HB = !(LA|\text{Mute}), \tag{8}$$

in which "Mute" corresponds to the condition where the mute signal is asserted, "NotMute" corresponds to the condition where the mute signal is deasserted, and "|" corresponds to the OR logical operator. The logic 202 can apply the mute signal to the high-side switches 212, 216 of the H-bridge 210, and/or the low-side switches 214, 218 of the H-bridge 210 in order to disable the respective switches, as desired and/or required, for generating the HA signal 312, the HB signal 314, the LA signal 316, and/or the LB signal 318.

In effect, the PWM signal 306 is modulated by a combination of the BoffA and BoffB signals 308, 310, such that the resulting modulation produces the drive signal 320 (see FIG. 3*c*) with no harmonics up to the fifth harmonic. Moreover, the series-resonant load of the amplifier/output stage 110 can provide a sufficient step-up voltage gain to reach the specified maximum level of the drive signal 320 (e.g., 300 volts peak-to-peak (p-p)), as well as filter the higher harmonics of the drive signal 320 for driving the capacitive load of the parametric loudspeaker 220, without appreciable artifacts or additional filtering.

It is noted that some or all of the logic and/or circuitry for generating the the SQ signal 302, the PWM signal 306, the BoffA signal 308, and/or the BoffB signal 310 can be implemented using a programmable processor or controller, digital circuitry, analog circuitry, and/or a combination thereof. It is further noted that the amplifier/output stage 200 can also be configured to employ phase modulation, as disclosed in U.S. Pat. No. 8,866,559 issued Oct. 21, 2014 entitled HYBRID MODULATION METHOD FOR PARAMETRIC AUDIO SYSTEM, the disclosure of which is hereby incorporated herein by reference in its entirety. To allow phase modulation, the pulse stream of the PWM signal 306, as well as the pulse streams of the BoffA and BoffB signals 308, 310, can be delayed, as desired and/or required, as a function of the input audio signal or any other suitable signal.

Moreover, the mute signal can be implemented independently of the logic 202 and used to protect the parametric loudspeaker system 100 against an overdrive condition, in the event the output drive signal is deemed to be excessive (as determined, for example, by a comparator). Alternatively, the mute signal can be implemented to allow the output drive signal to be muted under user control, and/or to allow a soft standby mode of operation.

It is noted that the amplifier/output stage 200 (see FIG. 2) can be configured to include the full H-bridge system 210, or a half-bridge system. Further, the resonant drive provided by the amplifier/output stage 200 can be implemented using series resonance, parallel resonance, or any suitable combination of series and parallel resonance, as well as active or passive filtering.

Bias Scheme

The types of ultrasonic/acoustic transducer(s) that may be employed in the parametric loudspeaker 120 (see FIG. 1) typically rely on electric fields for activation, and, due to the physics of such ultrasonic/acoustic transducer(s), can benefit from what is referred to herein as a "bias." Such a bias (Bias; see FIG. 1) can be implemented as a constant DC voltage added to the ultrasonic output drive signal (Output drive signal; see FIG. 1) of the amplifier/output stage 110. In one embodiment, a regulated voltage doubler (or voltage tripler, etc.) can be employed to step-up the voltage of the output drive signal, which can then be rectified and regulated to create the constant DC voltage. Such an approach can be implemented with a few capacitors and diodes, however it has some drawbacks. One drawback is that the bias is typically unavailable until a few seconds after the output drive signal appears at the amplifier/output stage 110. This can be managed by pre-charging the bias when the parametric loudspeaker system 100 is turned-on. However, if the parametric loudspeaker system 100 is idle for an extended period of time, the bias can gradually fade. This can be remedied by periodically re-charging the bias by playing some audible and/or ultrasonic material, or by delaying the audio input signal to give the bias sufficient time to recharge. However, such charging/re-charging of the bias and/or delaying of the audio input signal can be undesirable in a practical parametric loudspeaker system.

Figure 4A:
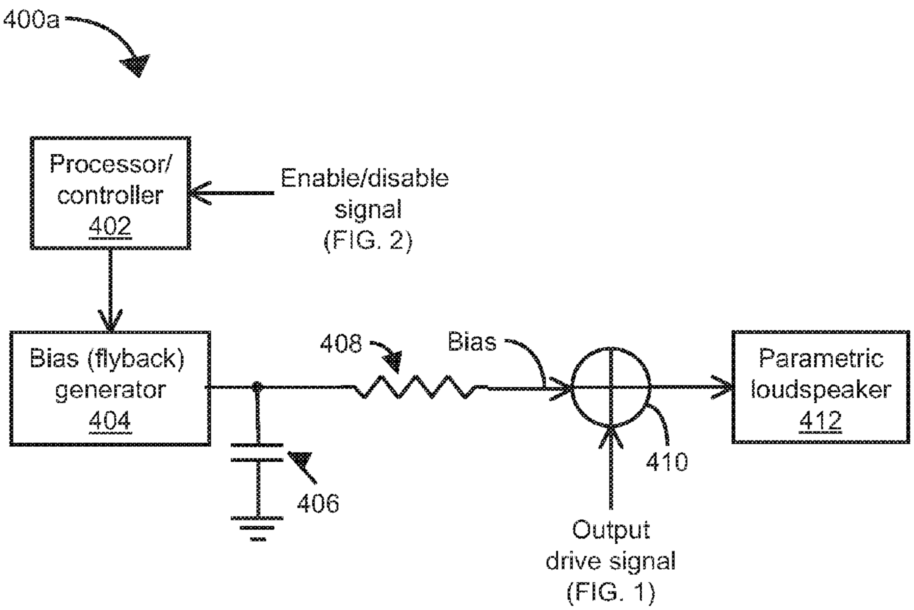
FIGS. 4*a* and 4*b* are block diagrams of exemplary schemes for implementing a bias in the parametric loudspeaker system of FIG. 1.

FIG. 4*a* depicts an illustrative embodiment of an exemplary system 400*a* for generating a DC bias signal. As shown in FIG. 4*a*, the system 400*a* can include a processor/controller 402, a bias generator 404, a capacitor 406, a resistor 408, and a summing circuit 410. In one embodiment, the bias generator 404 can be configured as a flyback generator for charging the bias almost instantaneously under the control of the processor/controller 402, and for maintaining the bias level (Bias; see FIG. 4*a*) for as long as desired and/or required, thereby assuring that a clean and consistent ultrasound output is produced at the summing circuit 410 for driving a parametric loudspeaker 412. In an alternative embodiment, the bias generator 404 can be implemented as a boost converter, voltage multiplier, etc.

It is noted that the system 400*a* of FIG. 4*a* can implement a flyback scheme using the processor/controller 402, which can be enabled/disabled by the microcontroller 222 (see FIG. 2). For example, such a flyback scheme may be employed to produce a constant DC bias voltage level (e.g., about 250 volts), or a variable DC bias voltage level. Such a flyback scheme for producing a variable bias can be configured to allow the bias level and/or the bias polarity to be set and/or changed dynamically based on the audio input signal, the ultrasonic output drive signal, and/or any other suitable signal or condition. For example, the bias polarity can be reversed during startup, or during a quiet or silent section of audio.

In one mode of operation, once the parametric loudspeaker system 100 (see FIG. 1) is turned-on, the bias (flyback) generator 404 can charge the capacitor 406 to the desired bias level (e.g., 250 volts or any other suitable voltage), and the resulting bias (Bias) can be fed to the summing circuit 410 through the current-limiting and isolation resistor 408. If the parametric loudspeaker system 100 is left idle for some period of time, then the bias generator 404 can be automatically disabled by the processor/controller 402 under the control of the logic 202 (see FIG. 2) in order to save power and/or reduce system stress, and subsequently re-enabled, as needed.

Figure 4B:
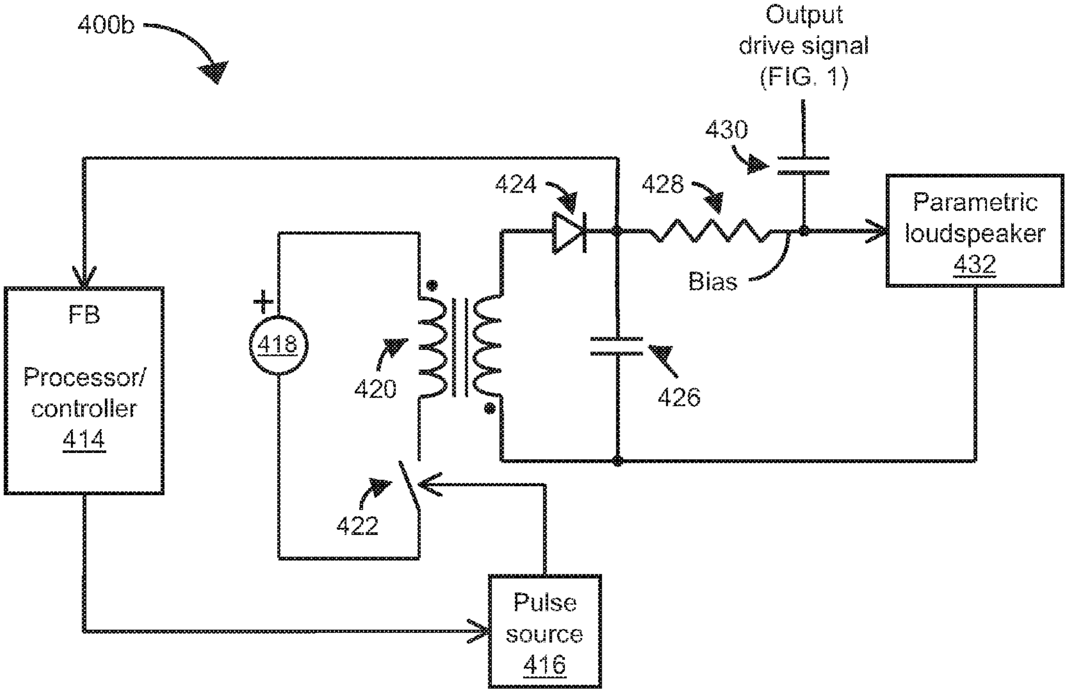

FIG. 4*b* depicts a further illustrative embodiment of an exemplary system 400*b* for generating a DC bias signal, using a flyback scheme. As shown in FIG. 4*b*, the system 400*b* can include a processor/controller 414, a pulse source 416, a voltage source 418, a transformer 420, a switch 422, a diode 424, a charging capacitor 426, a resistor 428, and a blocking capacitor 430. In the system 400*b*, the processor/controller 414 can be configured to control the pulse source 416, which, in turn, applies pulses to the switch 422 to generate a controlled, switched signal for charging the capacitor 426, thereby producing the bias (Bias). The processor/controller 414 can monitor a flyback (FB) voltage at the charging capacitor 426, and control the pulse source 416 based on the flyback voltage level in order to maintain the bias level (Bias; see FIG. 4*b*) for as long as desired and/or required.

Ultrasonic Ranging

An ultrasonic ranging feature can be incorporated into the parametric loudspeaker system 100 of FIG. 1. For example, such an ultrasonic ranging feature can allow the parametric loudspeaker system 100 to obtain an estimate of the distance to (or detect the presence of) a listener in the vicinity of the system for use in audio triggering, and/or for optimizing the system's nonlinear processing and/or volume in an effort to provide the best possible sound for the listener.

In one mode of operation, the parametric loudspeaker system 100 can transmit one or more ultrasonic pulses through the parametric loudspeaker 120, and then use the mute signal from the microcontroller 222 (see FIG. 2) to quickly disable the plurality of interconnected switches 212, 214, 216, 218 of the H-bridge 210 (see FIG. 2), thereby placing the ultrasonic/acoustic transducer(s) of the parametric loudspeaker 120 into what is referred to herein as an "open" state. The ultrasonic/acoustic transducer(s) in the open state can then generate a voltage(s) upon receipt of one or more returning pulses. Based on the generated voltage(s), the time interval between pulse transmission and pulse reception can be measured to estimate the distance from the parametric loudspeaker 120 to the listener, or to any other person and/or object. For example, the generated voltage(s) can be detected using the level/measure circuit 114, or any other suitable circuit.

In an alternative embodiment, the parametric loudspeaker system 100 can perform such pulse transmission/reception for ultrasonic ranging in conjunction with the ranging unit 121, which can be configured to perform one or more of detecting the reception of the returning pulses, estimating the distance from the parametric loudspeaker 120 to the listener, and, based on the estimated distance, making adjustments to the output drive signal through the amplifier/output stage 110.

Bass Enhancement

Those of ordinary skill in the art will appreciate that parametric loudspeakers can sometimes suffer from limited bass response, particularly in the absence of a subwoofer. Such limited base response of parametric loudspeakers can result from the second derivative of a demodulation equation, which typically exhibits about a twelve (12) decibel (dB) per octave slope as the frequency increases. In other words, more ultrasound is generally required for parametric loudspeakers to generate low frequency sound than high frequency sound.

Figure 5:
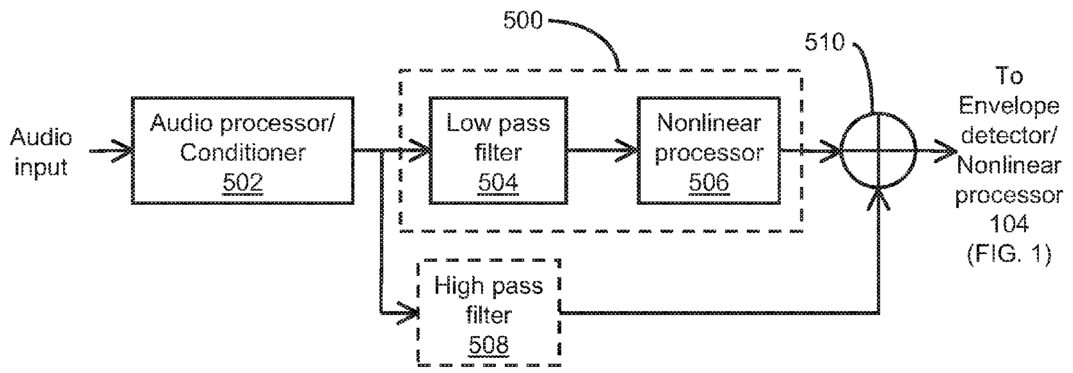
FIG. 5 is a block diagram for implementing bass enhancement in the parametric loudspeaker system of FIG. 1.

FIG. 5 depicts a plurality of circuit elements 500 that may be employed to ameliorate the limited base response characteristics of parametric loudspeakers. As shown in FIG. 5, the plurality of circuit elements 500 can include a low pass filter 504 and a nonlinear processor 506. FIG. 5 further depicts an audio processor/conditioner 502, an optional high pass filter 508, and a summing circuit 510. In one embodiment, the audio processor/conditioner 502, the low pass filter 504, the nonlinear processor 506, the high pass filter 508, and the summing circuit 510 can be implemented within the audio pre-processor/conditioner 102 (see FIG. 1), for example, after the volume adjustment. The low pass filter 504 is configured to be adjustable for flattening the frequency response down to a desired low frequency limit, and the nonlinear processor 506 is configured to provide a gentle low frequency distortion, thereby providing increased auditory information, and, therefore, more audibility in the low frequency range. The audio input signal may be the original source audio, or the original source audio modified by other processing (e.g., equalization, compression, etc.).

In effect, the low pass filter 504 and the nonlinear processor 506 operate to selectively apply a gentle distortion to low frequencies (e.g., frequencies below about 100-500 hertz (Hz)) of the audio input signal. In one embodiment, the nonlinear processor 506 is configured to implement a nonlinear distortion curve such as a smooth polynomial. In an alternative embodiment, the nonlinear processor 506 can be configured as a voltage clipper, a rectifier, and/or any other suitable processing functionality. The resulting distorted signal is then mixed, at the summing circuit 510, with the source audio input, which may be filtered by the high pass filter 508. It is noted that operational parameters of the low pass filter 504 and the nonlinear processor 506 can be user defined for adjustment, or automatically adjustable by the parametric loudspeaker system 100, based on volume levels and/or any other suitable signal characteristic(s).

In another embodiment, the nonlinear processor 506 can operate on the source audio input without low pass filtering in order to boost harmonic content, and to provide some extra distortion to make the output of the parametric speaker 120 louder. For example, the nonlinear processor 506 can be configured to provide such extra distortion by implementing a polynomial distortion curve, which can be adjustable. For example, the polynomial distortion curve can be a linear ramp that levels off gradually as the output increases. Further, the nonlinear processor 506 can provide such extra distortion (automatically or by user control) just before the resulting distorted signal undergoes envelope offset and distortion correction within the envelope detector/nonlinear processor 104 (see FIG. 1). By using the input/output measuring and ratio scheme, this is particularly well controlled.

Overdrive Mode

Figure 6:
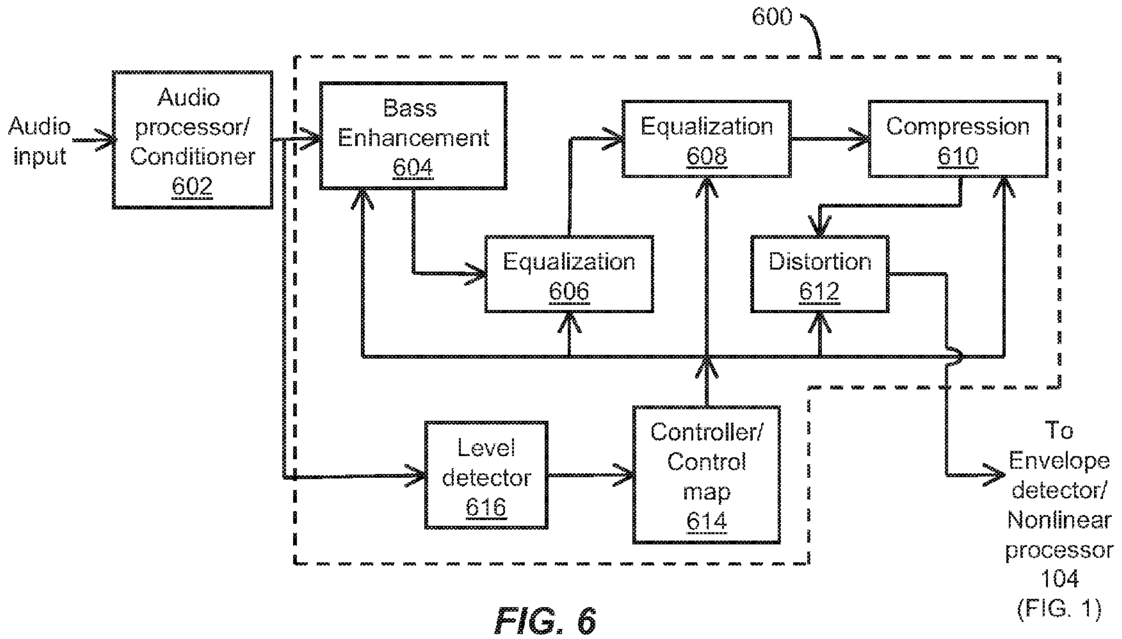
FIG. 6 is a block diagram for implementing an overdrive mode in the parametric loudspeaker system of FIG. 1.

FIG. 6 depicts additional circuit elements 600 that may be employed to implement an overdrive mode when the parametric loudspeaker system 100 (see FIG. 1) is at or near its output capacity, but additional output levels are desired and/or required by a user. As shown in FIG. 6, the functionality of the additional circuit elements 518 can include, but are not limited to, bass enhancement 604, equalization 606, 608, compression 610, and/or distortion 612. As further shown in FIG. 6, the additional circuit elements 600 can include a level detector 616 and a controller/control map 614. In one embodiment, the level detector 616 can receive its input from an audio processor/conditioner 602. Further, the audio processor/conditioner 602 and the additional circuit elements 600 can be implemented within the audio pre-processor/conditioner 102 (see FIG. 1), for example, after the volume adjustment.

Using the audio processing/conditioning techniques described herein, a bit of "acceptable" (gentle, pleasant) audible distortion can optionally be exchanged for some additional output, which is useful when a parametric loudspeaker is called upon to reproduce loud signals. In addition, while reproducing such loud signals, adjustments can be made (automatically and/or under user control) to the processing/conditioning performed on the audio input signal based, for example, on certain characteristics of the parametric loudspeaker and/or the desired output signal levels.

With reference to FIG. 6, the overdrive mode can be implemented by monitoring the level of the audio input signal at the level detector 616, which can be an envelope detector, a level/measure circuit, or any other suitable level detector or circuit. In an alternative embodiment, the level of the output signal may be monitored instead of the level of the audio input signal. Having monitored the audio input signal level, the level detector 616 can generate a corresponding level number. For example, the level detector 616 can derive the level number from the audio input signal and volume setting, and send the level number to the controller/control map 614, which can translate such level information into control adjustments for the various functionalities of the circuit elements 600.

Specifically, based at least on the level information from the level detector 616, the controller/control map 614 can make adjustments (automatic or user controlled) to the bass enhancement 604, the equalization 606, 608, the compression 610, and/or the distortion 612 functionalities of the various circuit elements 600. In one embodiment, the controller/control map 614 can make further adjustments to the low pass filter 504, the nonlinear processor 506, and/or the high pass filter 508 (see FIG. 5). For example, if the level information indicates the need to produce high signal levels, then the controller/control map 614 can make appropriate adjustments to reduce low frequency content, while increasing high frequency content (e.g., by adjusting the equalization 606, 608 functionalities), distortion (e.g., by adjusting the bass enhancement 604 functionality), and/or audible compression (e.g., by adjusting the compression 610 functionality).

Figure 7:
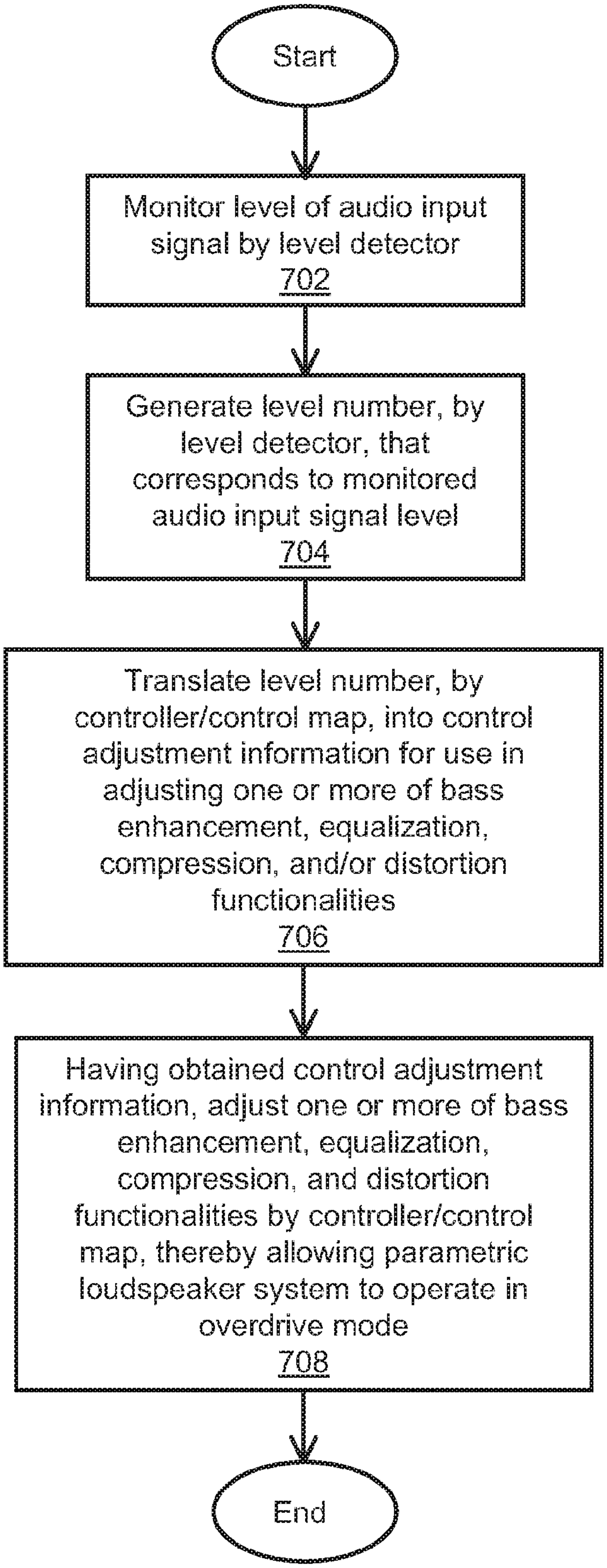
FIG. 7 is a flow diagram illustrating an exemplary method of operating the parametric loudspeaker system of FIG. 1 in the overdrive mode.

An illustrative method of implementing an overdrive mode in the parametric loudspeaker system 100 of FIG. 1 is described herein with reference to FIGS. 6 and 7. As depicted in block 702 (see FIG. 7), the level of an audio input signal is monitored by the level detector 616 (see FIG. 6). As depicted in block 704, a level number is generated, by the level detector 616, that corresponds to the monitored audio input signal level. As depicted in block 706, the level number is translated, by the controller/control map 614, into control adjustment information for use in adjusting one or more of the bass enhancement 604, the equalization 606, 608, the compression 610, and/or the distortion 612 functionalities of the various circuit elements 600. As depicted in block 708, having obtained the control adjustment information, one or more of the functionalities of the various circuit elements 600 (e.g., bass enhancement, equalization, compression, distortion, etc.) are adjusted by the controller/control map 614, thereby allowing the parametric loudspeaker system 100 to operate in the overdrive mode.

It should be appreciated that the terms and expressions employed herein are used as terms of description and not of limitation, and that there is no intention in the use of such terms and expressions of excluding any equivalents of the features shown and described or portions thereof.

It will be further appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. In a parametric audio system, a method of processing an audio input signal, the parametric audio system including an amplifier output stage for producing an ultrasonic drive signal based on a pre-amplified signal, the ultrasonic drive signal for driving a parametric loudspeaker, the method comprising:

obtaining a first scale factor based on a level of the pre-amplified signal and a level of the ultrasonic drive signal;

obtaining a second scale factor as an inverse of the first scale factor;

pre-processing the audio input signal by applying the second scale factor to the audio input signal;

post-processing the audio input signal by applying the first scale factor to the pre-processed audio input signal, the pre-amplified signal being based on the post-processed audio input signal; and producing the ultrasonic drive signal by the amplifier output stage, the ultrasonic drive signal being based on the pre-amplified signal.

2. The method of claim 1 wherein the obtaining of the first scale factor includes obtaining the first scale factor based on the level of the pre-amplified signal and the level of the ultrasonic drive signal, the level of the pre-amplified signal corresponding to a level of the post-processed audio input signal.

3. The method of claim 1 wherein the obtaining of the first scale factor includes obtaining the first scale factor based on the level of the pre-amplified signal and the level of the ultrasonic drive signal, the level of the pre-amplified signal corresponding to a level of an ultrasonic carrier signal modulated with the post-processed audio input signal.

4. The method of claim 1 wherein the obtaining of the first scale factor includes obtaining the first scale factor as a ratio of the level of the pre-amplified signal and the level of the ultrasonic drive signal.

5. The method of claim 1 wherein the pre-processing of the audio input signal includes performing one or more of equalization and compression on the audio input signal.

6. The method of claim 1 wherein the pre-processing of the audio input signal further includes detecting an envelope of the audio input signal.

7. The method of claim 1 wherein the pre-processing of the audio input signal includes applying a specified distortion to a predetermined low frequency band of the audio input signal to obtain a distorted audio input signal within the predetermined low frequency band.

8. The method of claim 7 wherein the applying of the specified distortion to the predetermined low frequency band of the audio input signal includes applying the specified distortion in accordance with a polynomial distortion curve.

9. The method of claim 7 wherein the pre-processing of the audio input signal further includes mixing the audio input signal with the distorted audio input signal.

10. The method of claim 9 wherein the pre-processing of the audio input signal further includes high-pass filtering the audio input signal prior to the mixing of the audio input signal with the distorted audio input signal.

11. The method of claim 1 wherein the post-processing of the audio input signal includes voltage-clipping the pre-processed audio input signal.

* * * * *